Sept. 13, 1966  F. L. WAITE  3,272,307
CONVEYOR SYSTEM
Filed May 17, 1965  6 Sheets-Sheet 1
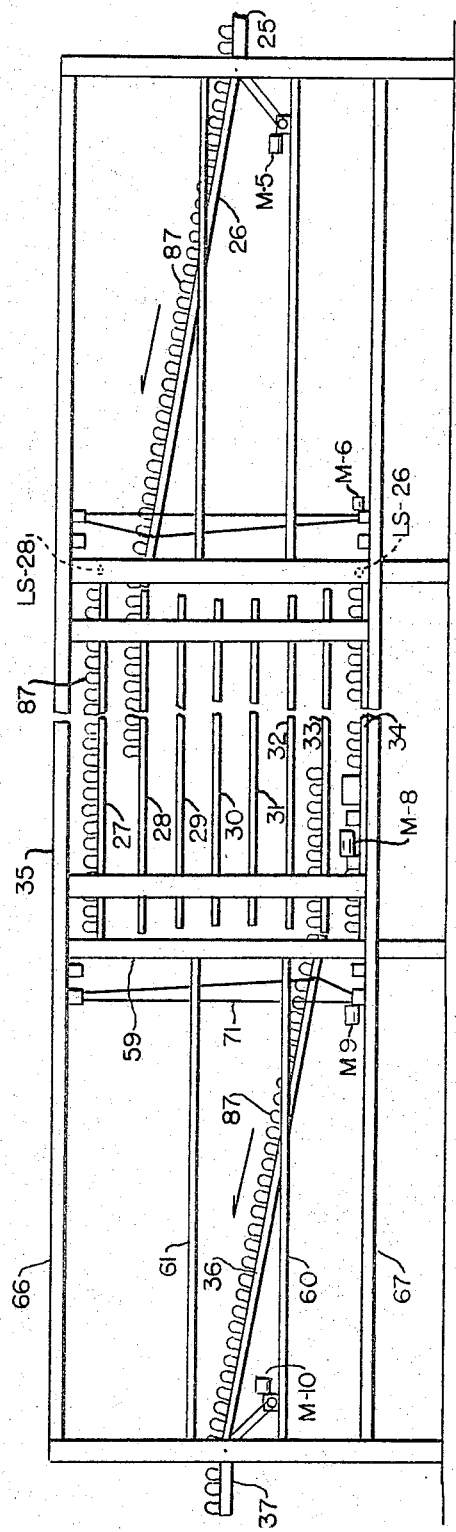
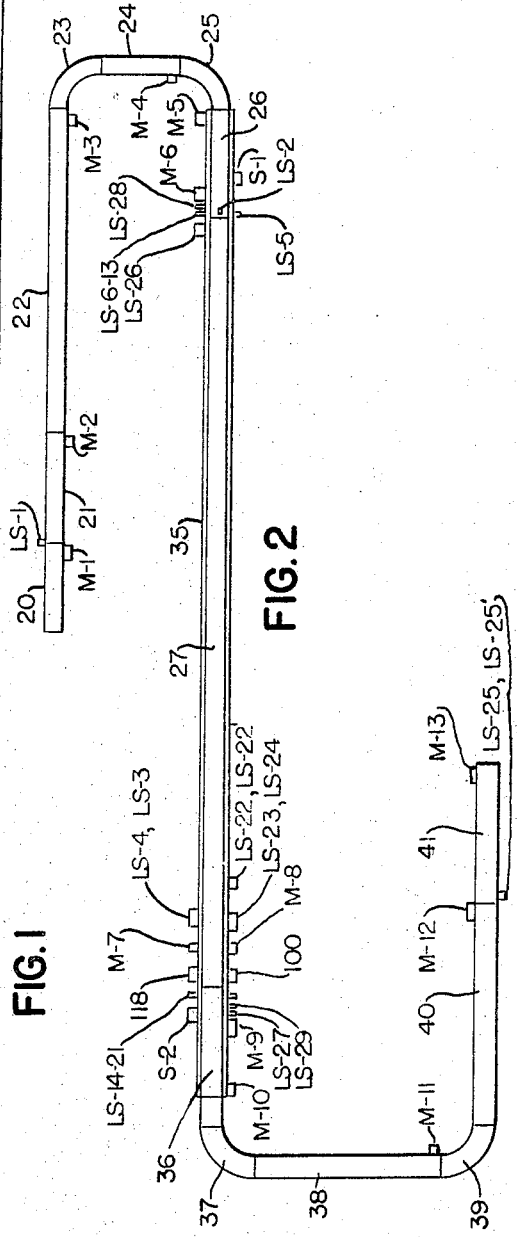
INVENTOR:
FRED L. WAITE

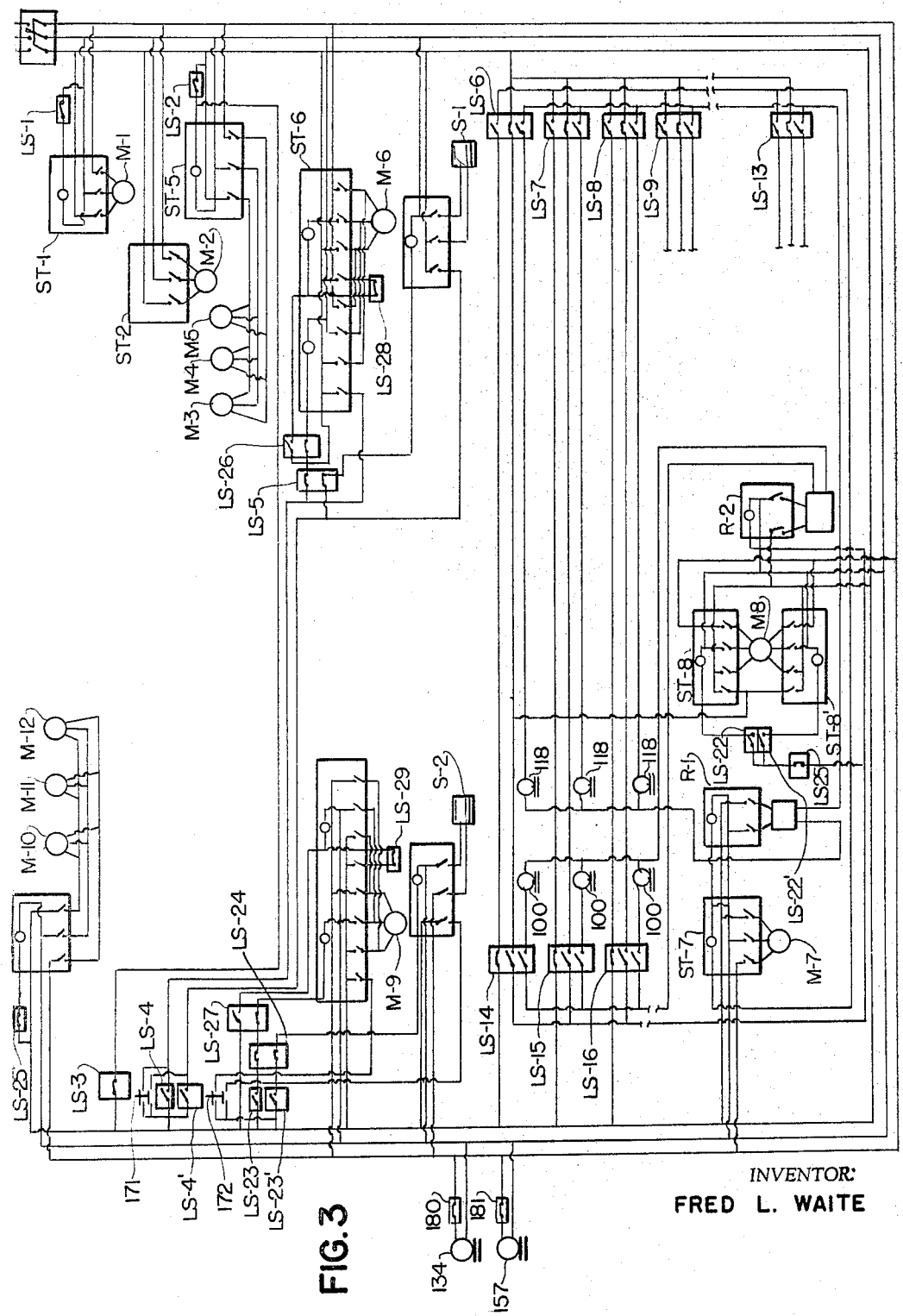

INVENTOR:
FRED L. WAITE

Sept. 13, 1966 F. L. WAITE 3,272,307
CONVEYOR SYSTEM
Filed May 17, 1965 6 Sheets-Sheet 4
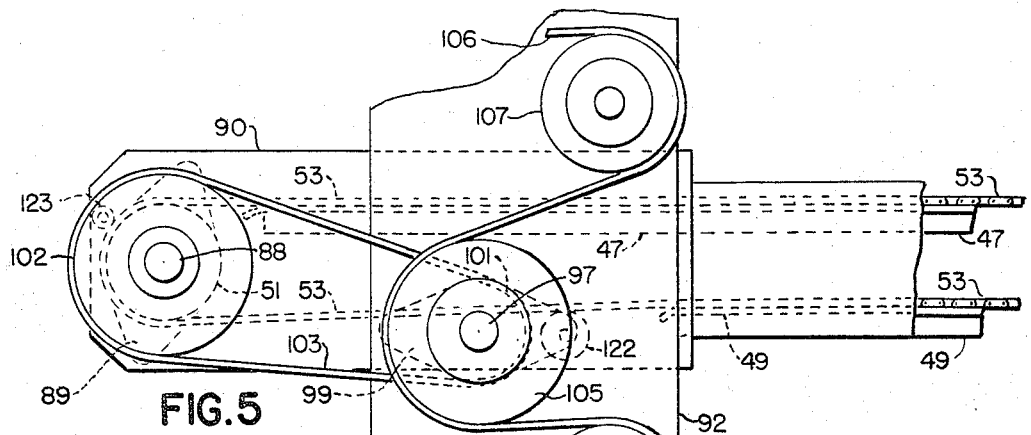
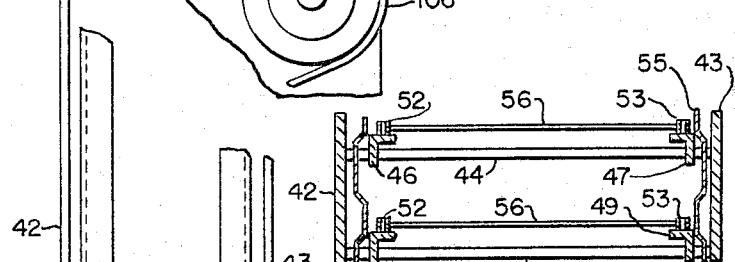
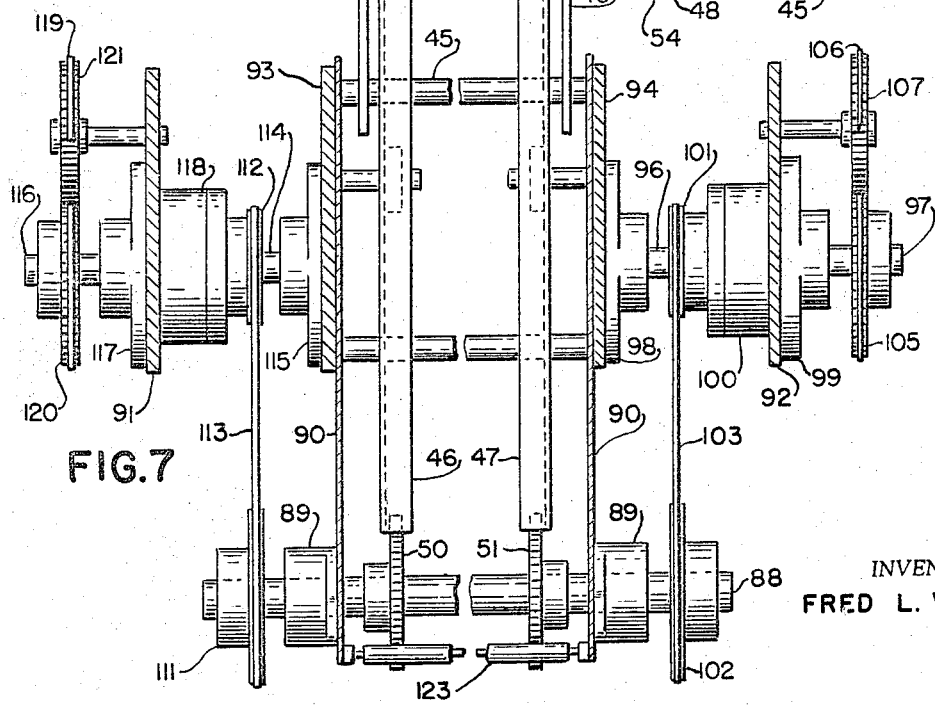
INVENTOR:
FRED L. WAITE

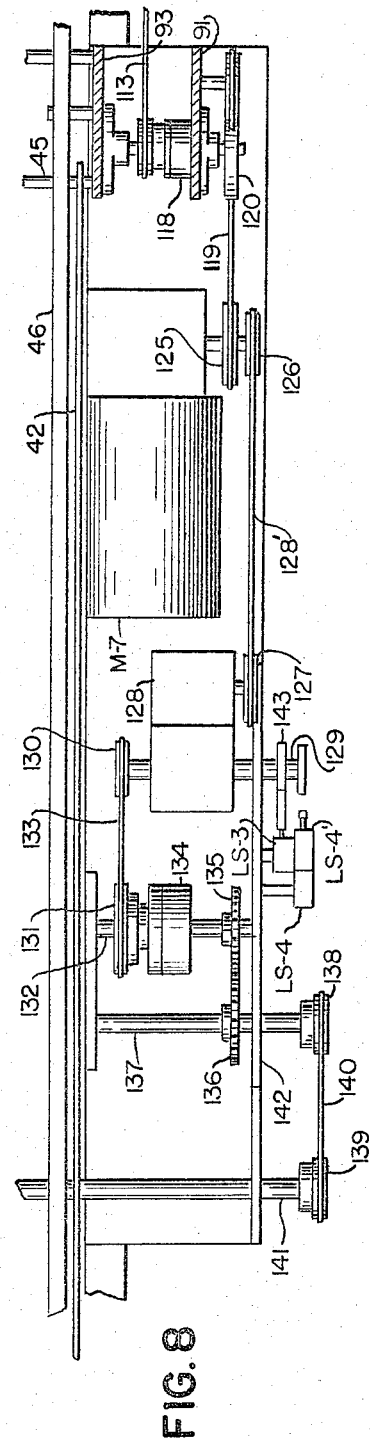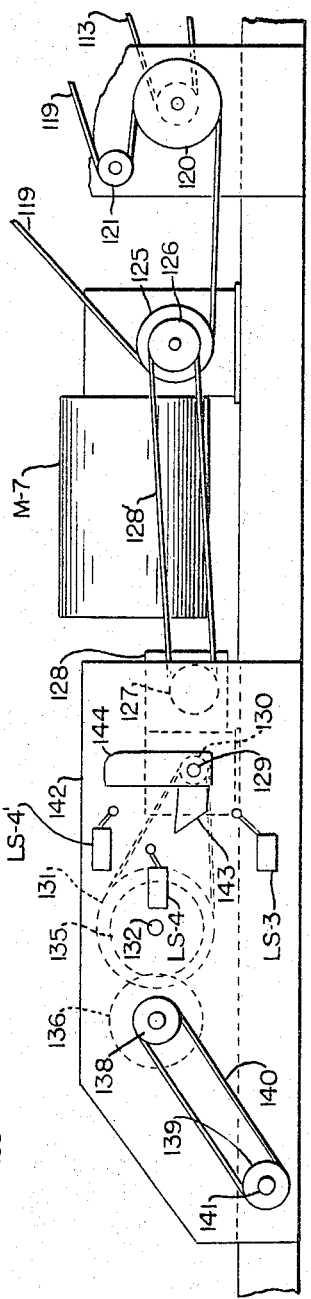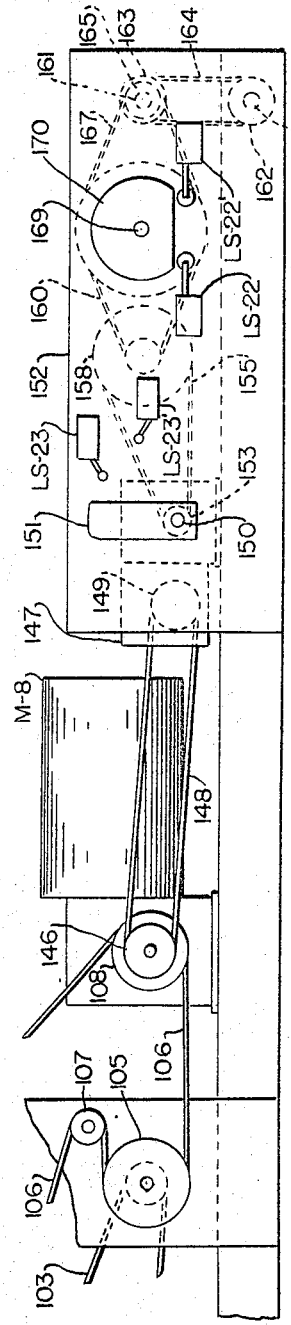

Sept. 13, 1966   F. L. WAITE   3,272,307
CONVEYOR SYSTEM

Filed May 17, 1965   6 Sheets-Sheet 6

INVENTOR:
FRED L. WAITE

United States Patent Office 3,272,307
Patented Sept. 13, 1966

3,272,307
CONVEYOR SYSTEM
Fred L. Waite, 1435 Bedford St., Stamford, Conn.
Filed May 17, 1965, Ser. No. 456,356
13 Claims. (Cl. 198—1)

This invention relates to a variable holdup or storage device in a conveyor system. More particularly, it relates to a system of parallel conveyor means forming a holdup magazine of variable capacity in a conveyor system.

It is an object of the invention to provide in a conveyor system a holdup magazine whose capacity is infinitely variable within its maximum limits.

It is an object of the invention to provide an adjustable interlock between a loading and unloading means of a storage compartment so that the holdup in the storage compartment may be selectively controlled.

Many continuous processes require for a process step a holdup zone wherein the material being conveyed is treated, as for example by heating or cooling. It is an object of the invention to provide conveyor means for such a treatment zone so that the holdup time in the zone may be selectively varied.

In many continuous process systems a breakdown will cause a piling up of material for the reason that the whole system cannot be shut down because of deleterious effects on the material in one or more of the process zones. Accordingly, it is an object of the invention to provide a takeup system to automatically store material during such a breakdown and then for automatically feeding such stored material back into the system at a predetermined rate following the repair of the breakdown.

The invention is particularly adaptable in the continuous production of baked products. Such products usually pass through a proofer zone of moderate temperature, an oven of high temperature and a cooler of low temperature. Following the cooling step the stream of baked goods may pass to slicing machines or packaging machines. The pass through the oven generally sets the speed of the entire system. There is generally considerable tolerance in the amount of time the product is in the cooler. Hence, the cooler may be utilized to compensate for breakdowns in the slicing or packaging machine. Thus it is an object of the invention to provide a conveyor magazine of adjustable capacity for use in a cooler so that the capacity may be temporarily increased to compensate for a breakdown in the slicer and then will automatically be decreased by a slightly speeded up outfeed when the slicer is back on line. Heretofore, this problem has been solved primarily by standby storage racks loaded and unloaded by manpower.

It is obvious to one skilled in the conveyor art that my adjustable conveyor magazine may be used for the proofer or may be placed in a chamber designed for the emergency holdup function caused by down-time in subsequent equipment.

Hence the following description of the invention made in connection with a bakery cooler may be regarded as illustrative only and not in a limiting sense.

Many other objects, advantages and features of the invention reside in the particular construction, combination and arrangement of parts involved in the embodiment of my invention and its practice as will be understood from the following description and accompanying drawings wherein:

FIG. 1 is a side elevation showing the vertically spaced conveyor tiers with the loading boom and the unloading boom;

FIG. 2 is a schematic plan view of a conveyor system in accordance with my invention;

FIG. 3 is a wiring diagram showing the circuitry connecting the electrical elements of my invention;

FIG. 5 is a detail of one end of a horizontal conveyor tier illustrating a drive support member;

FIG. 6 is a transverse vertical section through a conveyor tier or a loading or unloading boom;

FIG. 7 is a horizontal section taken through the drive end of one of the vertically spaced conveyor tiers with a central portion broken away and with the conveyor chains and support rods removed;

FIG. 8 is a top view of the loading drive of the spaced conveyor tiers;

FIG. 9 is a side view of the loading drive of the spaced conveyor tiers;

FIG. 10 is a side view of the unloading drive of the spaced conveyor tiers;

Figure 4:
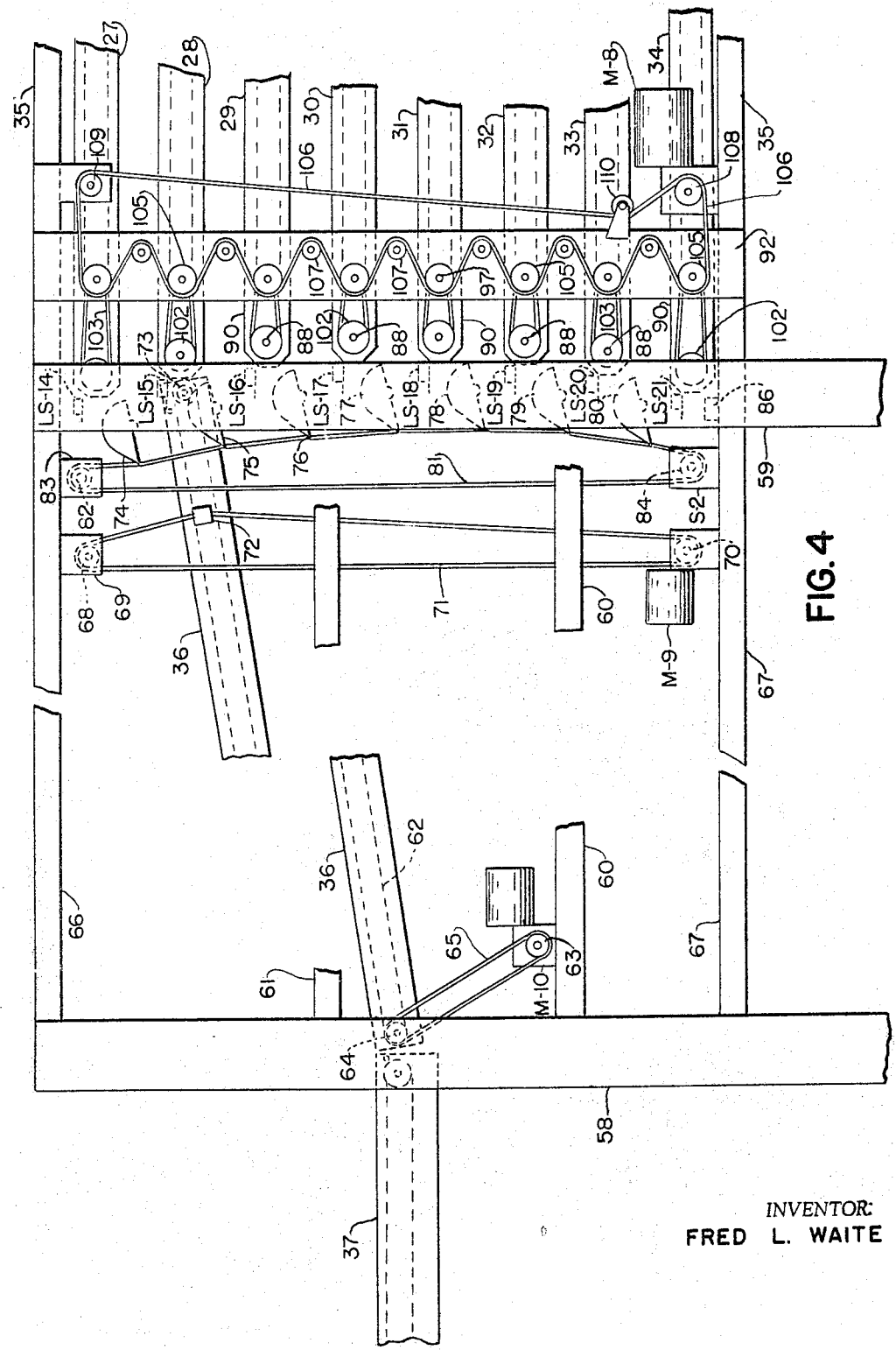
FIG. 4 is a side elevation showing the unloading boom and associated elements.

Referring to FIGS. 1 and 2, a roll depanner or the like 20 is driven by a motor M–1. Motor M–2 drives a free running roller conveyor which is pivotally mounted and counterbalanced so that, when it is loaded, it will activate a limit switch LS–1. Motor M–3 drives the conveyor 22. Motor M–4 drives the curved conveyor section 23, the straight conveyor section 24, and the second curved conveyor section 25. A loading boom 26, which is a pivotally counted conveyor section, is driven by motor M–5. A plurality of vertically spaced conveyor tiers 27–34 are disposed within a suitable support framework 35. The loading ends of tiers 27–34 are arranged on an arc centered about the pivot point of loading boom 26. Similarly, the unloading end of tiers 27–34 are arranged on an arc pivoted about the pivot of an unloading boom 36. Pivotally mounted unloading boom 36 is a conveyor driven by motor M–10. A curved conveyor section 37 and a straight conveyor section 38 are driven by motor M–11. Another curved conveyor section 39 and a straight conveyor section 40 are driven by motor M–12. The reference numeral 41 designates either a free sliding chute which is counterweighted or a counterweighted conveyor. If a conveyor 41 is used, motor M–13 is provided to drive it. Limit switches LS–25 and LS–25' respond to the motion of the chute or conveyor 41 when baked goods back up on it when subsequent operations such as slicing and packaging are interrupted.

Referring now to FIG. 6, a conveyor section 21, 22, 23, 24, 25, 37, 38, 39, 40 or 41, a conveyor tier 27–34, or a loading or unloading boom 26 or 30 may be of the following construction. Two side plates 42 and 43 have pairs of rod spacers 44 and 45 fixed between them to position them relative to each other. The rod spacers 44 and 45, which may consist of tie bolts passing through suitable spacers, support pairs of angle iron chain slides 46 and 47, and 48 and 49.

As is shown in FIGS. 5 and 7, each conveyor section has a pair of sprockets 50 and 51 mounted at ech end. Two endless loops of block chain 52 and 53 extend about the pairs of sprockets 50 and 51 with each run of the chains 52 and 53 resting upon an angle iron chain slide 46, 47, 48 and 49.

As may be further seen in FIG. 6, the rod spacers 44 and 45 may support a pair of chain guide plates 54 and 55 to laterally position the chains 52 and 53 on the chain slides 46, 47, 48 and 49. When sections of conveyor are butted together, the guides 54 and 55 may serve as splice plates to join butted side plates 42 and 43. Disposed close together and joining the links of the block chains 52 and 53 are the support bars 56 upon which the bakery goods rest. The curved sections of conveyor 23, 25, 37 and 39 are constructed in substantially the same manner as has been described except that the outer loop of chain 52 or 53 has support bars 56 fixed to it at greater intervals and it is driven at a higher speed to maintain a radial spacing of the support bars 56.

The loading boom 26 and the unloading boom 36 are substantially indentical and operate in much the same manner. As may be seen in FIGS. 1 and 4, the support framework 35 has two vertical end members 58 between which the unloading boom 36 is pivotally secured. Conveyor section 37 is also secured between the vertical end members 58 abutting the pivotally secured end of unloading boom 36.

Referring further to FIG. 4, the support framework 35 has a pair of vertical support members 59 disposed on each side of the free end of the unloading boom 36. Longitudinal frame members 60 and 61, shown partly broken away in FIG. 4, extend between the vertical end members 58 and the vertical support members 59. A motor M-10 may be mounted on a longitudinal frame member 60 to drive the conveyor 62 by means of a drive sprocket 63, a driven sprocket 64, and a chain 65.

Upper and lower longitudinal frame members 66 and 67 extend between the vertical end members 58 and the vertical support members 59. Sprockets 68 are rotatably mounted on suitable flanges 69 secured to the upper longitudinal frame members 66. The unloading boom hoist motor M-9 is mounted on a lower longitudinal frame member 67 to drive a pair of sprockets 70 on a common shaft. A pair of unloading boom hoist chains 71 are each fixed at one point to the side of unloading boom 36 by means of a pair of fittings 72. Thus motor M-9 drives chain 71 about the sprockets 68 and 70 to raise and lower the free end of the unloading boom 36.

As is further shown in FIG. 4, a pair of cam rollers 73 are fixed to the sides of the free end of the unloading boom 36. Adjacent to the end of each conveyor tier 27-33 there is rotatably positioned on the inner sides of the vertical support members 59 a pair of positioning cams 74-80. The outwardly disposed ends of the pairs of positioning cams 74-80 are attached to a pair of chains 81 which pass about the upper sprockets 82 mounted on suitable flanges 83 fixed to the upper members 66. The chains 81 pass about the sprockets 84 which are rotated through a desired number of degrees by a suitable solenoid activated drive mechanism S-2. Before the motor M-9 is activated to shift the unloading boom 36 from one conveyor tier 27-34 to another, solenoid S-2 is activated to rotate the sprockets 84 counterclockwise, as shown, to withdraw the support cams 74-80 from contact with the cam rollers 73. After motor M-9 positions the boom 36 slightly below a conveyor tier 27-34, solenoid S-2 again returns the positioning cams 74-80 to the positions shown to effect a final accurate positioning of the free end of the unloading boom 36. The lowermost conveyor tier 34 does not require a pair of positioning cams adjacent to its outermost end as a pair of stops 86, which are contacted by the cam rollers 73, arrest the downward motion of the free end of boom 36 to position it.

Referring now to FIG. 1, the cooler of this invention generally operates in the following manner. Bakery goods 87 from the section of conveyor 25 are passed along the loading boom 26 and loaded in sequence onto conveyor tiers 27-34. After a desired time interval, the unloading boom 36, in a sequence following that of the loading boom 26, unloads the conveyor tiers 27-34. Mechanisms, which will be hereinafter described in connection with the detailed operation of this invention, regulate the time interval between the loading of goods 87 by the loading boom 26 onto the conveyor tiers 27-34 and the withdrawal of goods by the unloading boom 36 from the conveyor tiers 27-34. The time interval between the loading and the unloading of the conveyor tiers 27-34 determines the total holdup or cooling time of the bakery goods 87 while on the cooler of this invention. However, it will be apparent that each of the conveyor tiers 27-34 must be driven or activated only while bakery goods are being loaded on it by the loading boom 26 or while bakery goods are being unloaded from it by unloading boom 36.

The drives for the conveyor tiers 27-34 may be understood by referring to FIGS. 2, 4, 5 and 7. The conveyor tiers 27-34 are only driven at their unloading ends so that the loaded upper surfaces of the conveyors will be under tension. A shaft 88 is rotatably mounted by means of a pair of bearing brackets 89 which are secured to the ends of the extension side plates 90 of each conveyor tier 27-34. Shafts 88 carries the sprockets 50 and 51 which drive the endless conveyor chains 52 and 53.

Two drive support members 91 and 92 extend downward alongside the pair of vertical support members 93 and 94 which support the unloading ends of the conveyor tiers 27-34. As may be seen in FIGS. 4, 5 and 7, two shafts 96 and 97 are rotatably mounted in the bearing brackets 98 and 99. For each conveyor tier an unloading magnetic clutch 100 may be activated to drivingly connect shaft 97 to shaft 96 so that a sprocket 101 on shaft 96 may drive sprocket 102 mounted on a shaft 88 by means of a chain 103. The shafts 97, as may be seen in FIG. 4, have the sprockets 105 mounted on them. All the sprockets 105 are driven by a chain 106 which follows a serpentine path about the sprockets 105 and the rotatably mounted idler sprockets 107. The unloading drive motor M-8 drives chain 106 by means of sprocket 108. Chain 106 also passes about the idler pulleys 109 and 110 when making its run away from motor M-8. The hereinbefore described elements comprise the unloading drive of the conveyor tiers 27-34.

Referring further to FIG. 7, each shaft 88 also carries a sprocket 111 which is driven by sprocket 112 by means of chain 113. Sprocket 112 is mounted on shaft 114 which rotates within the bearing bracket 115. The abutting shaft 116 rotates within bearing bracket 117 and carries the magnetic clutch 118. A conveyor tier loading motor M-7, which is shown in FIG. 2, drives the endless chain 119 which follows a serpentine path about the sprockets 120 and the idler sprockets 121 in a manner identical to that shown for the unloading side of the conveyor tiers 27-34.

Thus it may be seen that the activation of a magnetic clutch 100 will enable motor M-8 to unload a specific conveyor tier 27-34. In a like manner, the activation of a magnetic clutch 118 will enable the loading motor M-7 to drive a given conveyor tier 27-34 to load it. The loading ends of the conveyor tiers 27-34 are identical to the unloading ends shown in FIGS. 5 and 7 except that the shafts 88 do not carry the sprockets 102 and 111 and the corresponding loading and unloading drives are not needed. As shown in FIG. 5, a pair of idler rollers 122 may be provided to guide the return runs of the chains 52 and 53 onto the angle iron chain slides 48 and 49. FIGS. 5 and 7 show a roller 123 which is used to assist in transferring bakery goods between the end of each conveyor tier to the free end of a boom 36 (26). If desired, the rollers 123 may be driven by any suitable means (not shown) linking them to the shafts 88.

Referring now to FIGS. 8 and 9, it may be seen that the loading drive motor M-7 drives the conveyor tiers 27-34 by means of a motor sprocket 125, the chain 119, and the sprockets 120 about which the chain 119 follows a serpentine path. The loading drive motor M-7 also carries a motor sprocket 126 which, by means of chain 128', drives sprocket 127 mounted on the gear reducer 128. Gear reducer 128 drives a shaft 129 at a reduced speed. Shaft 129 carries sprocket 130 which drives sprocket 131 on shaft 132 by means of chain 133. Sprocket 131 freely rotates on shaft 132, but it may be drivingly connected to shaft 132 to rotate it by means of the magnetic clutch 134.

Shafts 132 carries the gear 135 which meshes with gear 136 to drive the rotatably mounted shaft 137 in the opposite direction. Shaft 137, by means of the sprockets 138 and 139 and the chain 140, drives the shaft 141.

As shown in FIGS. 8 and 9, shaft 129 extends through the shaft support plate 142 to carry the switch activating cams 143 and 144. The function of these switch activating cams 143 and 144 and their associated switches will be hereinafter described when the detailed operation of my invention is explained.

Figure 11:
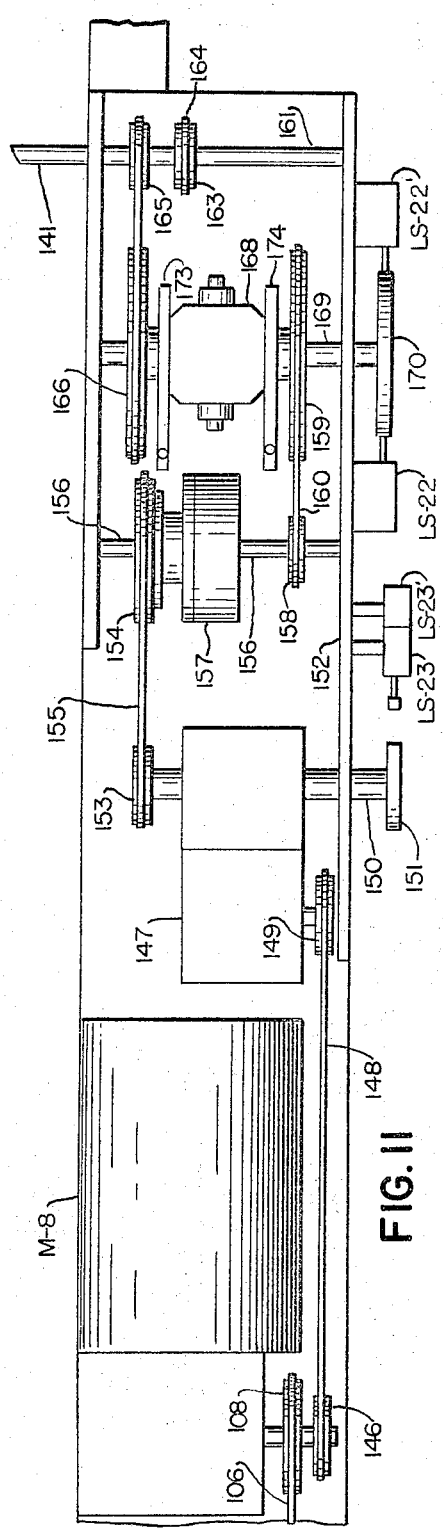
FIG. 11 is a top view of the unloading drive of the spaced conveyor tiers and the differential timer.

As may be seen in FIGS. 10 and 11, shaft 141, which is driven (FIG. 8) a given number of revolutions by the conveyor tier loading motor M–7 each time it is activated, extends across the entire cooler made in accordance with this invention to the unloading side.

Referring further to FIGS. 10 and 11, the conveyor tier unloading motor M–8 drives chain 106 by means of the motor sprocket 145. The shaft of motor M–8 also carries the drive sprocket 146 which drives a gear reducer 147 by means of the chain 148 and the sprocket 149. The gear reducer 147 drives a shaft 150 at a reduced speed. Shaft 150 carries a switch activating cam 151 which extends beyond the shaft support plate 152.

Shaft 150 also carries the sprocket 153 which drives sprocket 154 by means of chain 155. Sprocket 154 is rotatably mounted on shaft 156. By means of the magnetic clutch 157, sprocket 154 may be connected to shaft 156 to drive it. Shaft 156 has the sprocket 158 mounted on it to drive sprocket 159 by means of chain 160.

Figure 12:
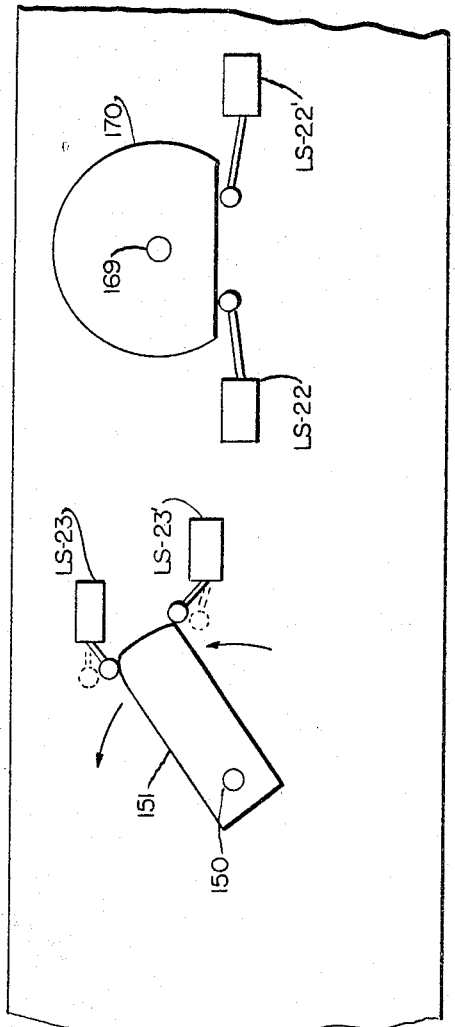
FIG. 12 is a side view of a fragment of the unloading drive showing a differential timer cam and an unloading cycle cam with associated switches.

Referring further to FIGS. 10, 11 and 12, shaft 141, driven by the loading motor M–7, extends below a shaft 161. Shaft 141 drives shaft 161 by means of the sprockets 162 and 163 and the chain 164. Sprocket 165 mounted on shaft 161 drives sprocket 166 by means of chain 167. The drives are such that the sprockets 159 and 166 are driven in opposite directions by the unloading motor M–8 and the loading motor M–7, respectively. These sprockets 159 and 166 are mounted as inputs to a differential 168 which has an output shaft 169 extending through plate 152. When the sprocket 166 driven by loading motor M–7 is driven the same number of revolutions as the sprocket 159 is driven by the unloading motor M–8, the differential output shaft 169 will not be rotated. Shaft 169 carries a switch activating cam 170 whose function will be hereinafter described.

By referring to FIGS. 2 and 3, the detailed operational sequence of this invention may be understood. Motor M–1 is energized through limit switch LS–1 by means of the starting switch ST–1. As has been described, limit switch LS–1 is a normally closed limit switch which opens when the counterweighted conveyor 21 is fully loaded. Motor M–2 is energized directly through the starting switch ST–2. Motors M–3, M–4, and M–5 are energized through limit switch LS–2 and LS–3 by means of the starting switch ST–5. Limit switch LS–2 is a normally open limit switch operated by a feeler (not shown) located on the head end of the loading boom 26. This feeler senses a bakery product 87 just at the transfer point between the loading boom 26 and the loading end of a conveyor tier 27–34.

Referring additionally to FIGS. 8 and 9, limit switch LS–3 is activated by the switch activating timer cam 143 to provide a momentary open circuit. When the switch LS–3 provides a momentary open circuit, limit switch LS–2 holds the circuit on starting switch ST–5 until there is no product at the transfer point between the loading boom 26 and a conveyor tier 27–34. When there is no product at the transfer point, LS–2 opens de-energizing starting switch ST–5.

The gear reducer 128 is connected to the loading motor M–7 with a suitable gear ratio so that the switch activating cams 143 and 144 make one revolution while one of the conveyor tiers 27–34 is driven through slightly less than 180 degrees. Thus if the conveyor tiers 27–34 were about 70 feet long, cam 143 would open the circuit after the conveyor tier 27–34, which was being loaded, had moved through a distance somewhat less than 70 feet. Further, to assure than there will be spaces between the bakery products 87 on the loading boom to allow limit switch LS–2 to open and not be held constantly closed by adjacent bakery products 87, the linear speed of the loading boom conveyor 26 is greater than the linear speed of the conveyors 22, 23, 24, and 25 carrying bakery products to it.

The loading motor M–7 is energized through one of the limit switches LS–6 through LS–13. The limit switches LS–6 through LS–13 are placed next to the loading ends of the conveyor tiers 27–34, respectively, to be activated by the free end of the loading boom 26. Each of these switches LS–6 through LS–13 has two normally open and one normally closed element.

Referring now to FIGS. 3 and 4, it may be seen that limit switches LS–14 through LS–21 are disposed at the unloading ends of the conveyor tiers 27–34. The limit switches LS–14 through LS–21 are activated by the free end of unloading boom 36 and these switches also contain two normally open elements and one normally closed element. As shown in FIG. 3, the normally closed element of limit switch LS–6 is connected in series with a normally open element of limit switch LS–14. In a like manner, the normally closed element of limit switch LS–14 is connected in series with a normally open element of limit switch LS–6. In this manner each of the corresponding limit switches LS–6 through LS–13 and the limit switches LS–14 through LS–21, respectively, are connected together in series. The other normally open element of each limit switch LS–6 through LS–13 is connected to a magnetic clutch 118 to drive a given conveyor tier during its loading cycle. Also, a normally open element of each limit switch LS–14 through LS–21 is connected to a magnetic clutch 100 which drives a conveyor tier 27–34 during its unloading cycle.

Referring further to FIG. 3, assume that the loading boom 26 is in position at conveyor tier 27 to activate limit switch LS–6. Assume, as is generally the case, that unloading boom 36 is not at the same tier position to activate limit switch LS–14 at the same time. Thus limit switch LS–6 will activate the magnetic clutch 118 associated with conveyor tier 27 to drive it. Limit switch LS–6 will also start loading motor M–7 through starting switch ST–7 and the relay R–1. Should, however, the unloading boom 36 be at conveyor tier 27 to activate limit switch LS–14, limit switch LS–6 could not activate switch ST–7 to start motor M–7 or relay R–1 to activate its clutch 118. In like fashion, limit switch LS–7 and limit switch LS–8 operate, respectively, with switches LS–15 and LS–16. The equivalent operation of LS–9 through LS–13 and LS–17 through LS–21 is not shown for purposes of simplicity.

Immediately following the start of loading motor M–7, limit switch LS–3 is allowed to close by cam 143 to energize starting switch ST–5 and motors M–3, M–4 and M–5. The loading of tier conveyor 27 continues until loading boom 26 is moved out of tier position by the boom hoist motor M–6. This movement of loading boom 26 opens limit switch LS–6 to de-energize loading motor M–7 and de-activate the engaged magnetic clutch 118. The closing of limit switch LS–4' by cam 144 activates the boom hoist motor M–6.

Referring now to FIGS. 3, 8 and 9, limit switches LS–4 and LS–4' are normally open switches which are operated by one revolution per loading cycle of the cam 144 which is driven by the tier loading motor M–7. Cam 144 is mounted on the same shaft as cam 143, but it is positioned to operate limit switches LS–4 and LS–4' immediately after limit switch LS-3 has been opened but with sufficient time delay to assure that starting switch ST-5 has dropped out through feeler limit switch LS-2. Cam 144 is designed to give only momentary contact to limit switches LS-4 and LS-4'. The loading boom 26 now moves toward the next tier position, in this case conveyor tier 28, until limit switch LS-5 de-energizes boom hoist motor M-6 and solenoid S-1.

Figure 13:
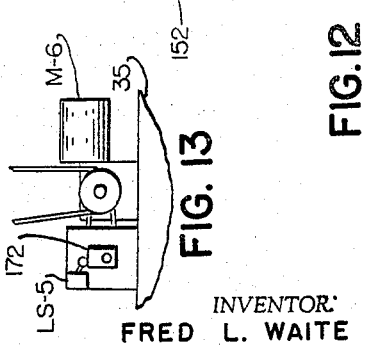
FIG. 13 is a side view of a fragment of the support frame showing the loading boom hoist motor.

As shown in FIG. 13, boom hoist motor M-6 drives a cam 172 through a suitable gear reduction. Cam 172 describes a complete revolution to open limit switch LS-5 as the loading boom 26 moves from one conveyor tier 27-34 to another. However, limit switch LS-5 is not activated when motor M-6 is reversed.

As may be seen in FIG. 3, limit switch LS-4' activates solenoid S-1, which is similar to solenoid S-2 which has been described, to retract positioning cams while the loading boom 26 is in motion. Limit switch LS-4 also activates motor M-6 through the reversing starting switch ST-6.

As may be seen in FIGS. 1 and 3, limit switches LS-26 and LS-28 are provided. Limit switch LS-26 reverses the boom hoist motor M-6 to raise the loading boom 26 from the lowest tier 34 to the top tier 27. When the boom 26 reaches the upper conveyor tier 27, it contacts limit switch LS-28 to de-energize the reverse portion of starting switch ST-6 and thus motor M-6. As loading boom 26 approaches each subsequent tier position, motor M-7 and the corresponding magnetic clutch 118 are energized. However, it is to be noted that the limit switches LS-7 through LS-13 are not activated when motor M-6 is in reverse and boom 26 is moving in one sweep from tier 34 back to tier 27. This may be arranged by having the sensing elements of the switches LS-7 through LS-13 respond to motion of boom 26 in one direction only.

Referring further to FIG. 3, the unloading sequence of the cooler of this invention may be understood. As it has been explained, unloading boom 36 will not be activated if it occupies the same tier position as loading boom 26. The tier conveyor unloading motor M-8 is energized by one of the limit switches LS-14 through LS-21. The limit switches LS-14 through LS-21 are in series with corresponding limit switches LS-6 through LS-13 and all the limit switches LS-14 through LS-21 are in series with the limit switches LS-22 and LS-22' and limit switch LS-25. Motor M-8 is a two speed motor which has its speed determined by the limit switches LS-22 and LS-22'. The limit switches LS-22 and LS-22' are activated by the cam 170 mounted on the output shaft 169 of the differential timer 168. The momentary position of the cam 170 is determined by the number of completed loading and unloading cycles and parts thereof. This is accomplished because sprocket 166 feeds rotations of the loading motor M-7 into one side of the bevel gear differential 168 and sprocket 159 feeds rotations of the unloading motor M-8 into the other side of the differential 168. Thus the output shaft 169 of the differential 168 will assume a position in proportion to the difference of the two input rotations.

Except for the two speed unloading rate of motor M-8, the unloading sequence is similar to the loading sequence already described. Thus the unloading sequence operates through the appropriate unloading clutch 100, limit switches, and corresponding elements. However, unlike the loading cycle, the motors M-8, M-10, M-11 and M-12 continue to operate while the unloading boom is being shifted by the hoist motor M-9 from one conveyor tier 27-34 to another. Further, these motors M-10, M-11 and M-12 are connected through limit switch LS-25', and motor M-8 is connected through limit switch LS-25.

As has been described in connection with FIG. 1, limit switches LS-25 and LS-25' are normally closed switches mounted on the counterweighted slide or conveyor 41 located just ahead of the slicing and wrapping equipment (not shown). Thus when the slicing and packaging operation proceeds at a normal rate, limit switches LS-25 and LS-25' remain closed. However, when sufficient delays cause the baked products to back up on the chute or conveyor 41, limit switches LS-25 and LS-25' open to automatically stop the unloading cycle or operation.

Limit switches LS-27 and LS-29 are the reversing switches for the unloading boom hoist motor M-9 and function in the same manner as the limit switches LS-26 and LS-28 function in connection with hoist motor M-6.

Start limit switches LS-4 and LS-4' for the starting switch ST-6 of the loading boom motor M-6 are paralleled by a momentary push button contact switch 171. This push button switch 171 is used if, for any reason, the main power supply should be discontinued while the loading boom 26 is between two tier positions. It is used to re-energize the loading boom hoist motor circuit. For the same reason, limit switches LS-23 and LS-23' which control the unloading boom hoist motor M-9 are also paralleled by a push button switch 172.

Thus it may be seen that the positioning of the loading boom 26 at any conveyor tier 27-34 automatically sets that tier in motion for its loading cycle. This closes LS-3 which activates ST-5 and in turn motors M-3, M-4 and M-5. When the tier has been loaded, after it has made slightly less than 180 degrees of travel, the loading conveyor motors M-3, M-4 and M-5 stop and the loading boom 26 is moved by hoist motor M-6 toward the next tier 27-34. The movement of the loading boom 26 away from a given tier position causes that particular conveyor tier 27-34 to stop. In this manner each conveyor tier 27-34 is successively and independently loaded.

In a similar manner and at a given time distance behind the loading boom 26, the unloading boom 36 automatically sets each conveyor tier 27-34 in motion to unload it. The unloading boom 36 follows the same sequence as the loading boom 26 from tier to tier unloading the successive tiers as they move more than 180 degrees.

When the operation of a cooler in accordance with this invention is proceeding normally, the linear speed of the conveyor tiers 27-34 is the same during their loading and unloading. Thus the time required for a particular bakery product 87 to travel from the oven to the packaging area is a given pre-set time. However, when a stoppage occurs, as in the packaging operation, limit switches LS-25 and LS-25' open, stopping the unloading boom conveyor 36 and the conveyors 37-41. Since the loading operation is independent of the unloading operation, the loading of the conveyor tiers 27-34 continues. However, the differential 168 responds to the continued rotation of sprocket 166 while sprocket 159 is at rest to record the amount of loading time over unloading time by rotation of the differential cam 170. After cam 170 has turned a few degrees, it actuates limit switch LS-22' to drive the conveyor tier unloading motor M-8 at the higher rate of speed through the motor starting switch ST-8' when limit switch LS-25 is again closed, as shown in FIG. 3.

Referring additionally to FIG. 1, if, for example, conveyor 21 is driven at 20 feet per minute, conveyors 22, 23, 24 and 25 at 24 feet per minute, loading boom 26 at 36 feet per minute, and the loading speed of the tier conveyors 27-34 is 24 feet per minute, then the normal unloading speed for the conveyor tiers 27-34 would also be 24 feet per minute with the unloading boom conveyor 36 operating at 36 feet per minute along with the conveyors 37, 38, 39, 40 and 41. However, when motor M-8 is driven through starting switch ST-8', motor M-8 would run at the faster rate of 36 feet per minute, thus permitting the unloading boom to "catch up" with the loading boom until it reached its original predetermined distance behind the loading boom whereupon the differential cam would activate switch LS–22.

Thus it may be seen that, when a delay in packaging has been corrected and limit switches LS–25 and LS–25' again close, the unloading of the conveyor tiers 27–34 proceeds at the faster rate of 36 feet per minute rather than the normal rate of 24 feet per minute. Since the loading rate continues at the rate of 24 feet per minute, the faster unloading rate causes sprocket 159 to rotate at a greater speed than sprocket 166 to cause cam 169 to rotate backward in the opposite direction until limit switch LS–22' opens and limit switch LS–22 closes. Limit switch LS–22 then drives motor M–8 at its normal rate of speed through starting switch ST–8. At its normal rate of speed, motor M–8 unloads the conveyor tiers 27–34 at the rate of 24 feet per minute which is the same rate at which they are loaded.

The capacity for surplus storage time or holdup time permitted by a cooler or proofer or other conveyor device made in accordance with this invention is limited only by the total capacity built into the conveyor tiers 27–34. Should a stoppage delay exceed this capacity, the loading boom 26 will overtake the unloading boom 36 at one of the tier positions so that both booms 26 and 36 occupy the same tier position. This shuts off the loading cycle until the unloading cycle of that tier has been completed. When the loading cycle is thus interrupted, the conveyors 20–25 are automatically stopped until the loading cycle can be resumed.

If for any reason the normal loading cycle is discontinued the unloading cycle should be maintained at normal speed by disengaging magnetic clutch 157 by opening switch 181. This maintains the desired cooling time on the baked products until the cooler is unloaded. This will, however, change a given pre-set cooling time relation between the loading and unloading booms which should be reset before the cooler is again used. During normal unloading of the cooler the loading conveyors and boom continue to operate even though no product is being loaded. Hence, the pre-set cooling time relation is maintained and the cooler is ready for immediate reloading.

From time to time it may be desirable to alter the normal pre-set holdup time, that is, the time lag between booms on loading and unloading. This alteration could be required because a change was made in the production of bakery products 87, it could be required because the temperature or other atmospheric conditions varied, or it could be required for other reasons. Any given cooling time is occasioned only by the relative pre-set differential differences of revolutions fed into differential 168 by the sprockets 166 and 159 by the loading and unloading drives. Since the sprockets 166 and 159 are driven through the magnetic clutches 134 and 157, respectively, clutch 157 may be disengaged by switch 181 to shorten the total cooling time or the clutch 134 may be disengaged by switch 180 for increasing the cooling time (the unloading boom being stopped). In this way the cooler of this invention may, without interrupting its operation, be set for any desired cooling time within its capacity.

As shown in FIG. 11, two adjustable brakes 173 and 174 may be applied to the hubs or shafts of the differential input sprockets 159 and 166 to prevent feedback when either magnetic clutch 157 or 134 is disengaged. The brakes 173 and 174 are set just tight enough to be sure to overcome the load on the output shaft of the differential. This load consists of bearing friction and the force required to turn cam 170 against the mechanical resistance of switches LS–22 and LS–22'. If the brakes 173 and 174 were not provided, the turning of sprocket 166 might produce an opposite rotation on sprocket 159 when magnet clutch 157 was not engaged so that the differential 168 would not turn cam 170.

Although I have described my invention in the best form known to me, it will nevertheless be understood that this is purely exemplary and that modifications in the construction, combination and arrangement of parts, and the substitution of equivalents, mechanically and otherwise, may be made without departing from the spirit and scope of the invention except as it may be more limited in the appended claims wherein:

I claim:

1. In a conveyor system having an adjustable holdup capacity, infeed conveyor means, outfeed conveyor means, a plurality of discrete conveyor means sequentially in parallel between said infeed conveyor means and said outfeed conveyor means, switching means connected to said infeed conveyor means, said switching means switching successively in a predetermined sequence to each of said discrete conveyor means, a second switching means connected to said outfeed conveyor means, said second switching means switching successively to each of said discrete conveyor means, said second switching means following at a predetermined time interval the successive switching of said first switching means.

2. A plurality of systemically parallel conveyors, means to drive said conveyors selectively at a one speed and at a higher speed, a feed conveyor to consecutively load said parallel conveyors at said one speed, a delivery conveyor to consecutively unload said conveyors, said delivery conveyor following said feed conveyor at a predetermined time lag.

3. A plurality of systemically parallel conveyors, means to drive said conveyors selectively at a one speed and at a higher speed, a feed conveyor to consecutively load said parallel conveyors at said one speed, a delivery conveyor to consecutively unload said conveyors, said delivery conveyor following said feed conveyor at a predetermined time lag, said feed and delivery conveyors being independently operable, and selective means to coordinate the operation of said conveyors to operate said delivery conveyor to follow said feed conveyor at a predetermined time lag.

4. A plurality of systemically parallel endless conveyors, means to drive said conveyors selectively at a one speed and at a higher speed, a feed conveyor to consecutively load said parallel conveyors at said one speed, a delivery conveyor to consecutively unload said conveyors, said delivery conveyor following said feed conveyor at a predetermined time lag, said feed and delivery conveyors being independently operable, and selective means to coordinate the operation of said conveyors to operate said delivery conveyor to follow said feed conveyor at a predetermined time lag, said delivery conveyor being independently arrested, and means to operate said parallel conveyors and said delivery conveyor at said higher speed when said predetermined time lag is exceeded.

5. A proofer or cooler for bakery products having a pivotally mounted loading boom conveyor, a pivotally mounted unloading boom conveyor, vertically spaced conveyor tiers having loading and unloading ends and being disposed between said boom conveyors, means driving and loading each of said conveyor tiers upon the pivoting of said loading boom conveyor to a position adjacent to each of said conveyor tiers, means driving and unloading each of said conveyor tiers upon the pivoting of said unloading boom to a position adjacent to each of said conveyor tiers, loading hoist means successively positioning said loading boom conveyor adjacent to the loading ends of said conveyor tiers, and unloading hoist means successively and independently positioning said unloading boom conveyor adjacent to the unloading ends of said conveyor tiers successively unloading each of said conveyor tiers a pre-set time interval after the loading of said conveyor tiers.

6. A proofer or cooler for bakery products having a pivotally mounted loading boom conveyor, a pivotally mounted unloading boom conveyor, vertically spaced conveyor tiers having loading and unloading ends and being disposed between said boom conveyors, first conveyor means conveying bakery products to said loading boom conveyor, second conveyor means conveying bakery products from said unloading boom conveyor, means responsive to the pivoting of said loading boom conveyor to a position adjacent to each of said conveyor tiers driving and loading each of said conveyor tiers, means responsive to the pivoting of said unloading boom conveyor to a position adjacent to each of said conveyor tiers driving and unloading each of said conveyor tiers, loading hoist means successively positioning said loading boom conveyor adjacent to the loading ends of conveyor tiers, and unloading hoist means successively and independently positioning said unloading boom conveyor adjacent to the unloading ends of said conveyor tiers successively unloading each of said conveyor tiers a pre-set time interval after the loading of said conveyor tiers.

7. A proofer or cooler for bakery products having a pivotally mounted loading boom conveyor, a pivotally mounted unloading boom conveyor, vertically spaced conveyor tiers having loading and unloading ends and being disposed between said boom conveyors, first conveyor means conveying bakery products to said loading boom conveyor, second conveyor means conveying bakery products from said unloading boom conveyor, means responsive to the pivoting of said loading boom conveyor adjacent to each of said conveyor tiers driving and loading each of said conveyor tiers at a given loading speed, means responsive to the pivoting of said unloading boom conveyor adjacent to each of said conveyor tiers driving and unloading each of said conveyor tiers at a lower speed and at a higher speed, loading hoist means successively positioning said loading boom conveyor adjacent to the loading ends of said conveyor tiers successively loading each of said conveyors tiers, unloading hoist means successively positioning said unloading boom conveyor adjacent to the unloading ends of said conveyor tiers successively unloading each of said conveyor tiers, and means responsive to the loading and unloading of said conveyor tiers advancing said means driving and unloading said conveyor tiers to its higher speed when the unloading of said conveyor tiers exceeds the loading of said conveyor tiers by more than a pre-set time interval.

8. A proofer or cooler for bakery products having a pivotally mounted loading boom conveyor, a pivotally mounted unloading boom conveyor, vertically spaced conveyor tiers having loading and unloading ends and being disposed between said boom conveyors, first conveyor means conveying bakery products to said loading boom conveyor, second conveyor means conveying bakery products from said unloading boom conveyor, loading hoist means successively pivoting said loading boom conveyor to positions adjacent to the loading ends of said conveyor tiers, a loading drive motor, means driven by said loading drive motor driving and loading each of said conveyor tiers at a given loading speed when said loading boom conveyor is pivoted to a position adjacent to each of said conveyor tiers, unloading hoist means successively pivoting said unloading boom conveyor to positions adjacent to the unloading ends of said conveyor tiers, a two speed unloading drive motor, means driven by said unloading drive motor driving and unloading each of said conveyor tiers at a slower and faster speed when said unloading boom conveyor is pivoted to a position adjacent to each of said conveyor tiers, and means responsive to the operation of said loading and unloading drive motors maintaining a pre-set time interval between the successive loading and unloading of said conveyor tiers by advancing said two speed unloading drive motor to its higher speed when the unloading of said conveyor tiers exceeds the loading of said conveyor tiers by more than the pre-set time interval.

9. A proofer or cooler for bakery products having a pivotally mounted loading boom conveyor, a pivotally mounted unloading boom conveyor, vertically spaced conveyor tiers having loading and unloading ends and being disposed between said boom conveyors, first conveyor means conveying bakery products to said loading boom conveyor, second conveyor means conveying bakery products from said unloading boom conveyor, loading hoist means successively pivoting said loading boom conveyor to positions adjacent to the loading ends of said conveyor tiers, a loading drive motor, means driven by said loading drive motor driving and loading each of said conveyor tiers at a given loading speed when said loading boom conveyor is pivoted to a position adjacent to each of said conveyor tiers, unloading hoist means successively pivoting said unloading boom conveyor to positions adjacent to the unloading ends of said conveyor tiers, a two speed unloading drive motor having high and low speed associated circuitry, means driven by said unloading drive motor driving and unloading each of said conveyor tiers at a higher and a lower speed when said unloading boom conveyor is pivoted to a position adjacent to each of said conveyor tiers, a differential having two inputs driven in opposite directions by said loading and unloading drive motors and having an output, first switch means activated by said differential output connecting said low speed circuitry to said unloading drive motor to maintain a pre-set time interval between the successive loading and unloading of said conveyor tiers, and second switch means being activated by rotation of said differential output to connect said high speed circuitry to said unloading drive motor when the unloading of said conveyor tiers exceeds the loading of said conveyor tiers by more than the pre-set time interval.

10. The combination according to claim 5 with the addition of first clutch means through which said loading drive motor drives one of the inputs of said differential, and second clutch means through which said unloading drive motor drives one of the inputs of said differential, said first clutch means being disengaged during the operation of the cooler or proofer to lengthen the pre-set time interval between the loading and unloading of said conveyor tiers, said second clutch means being disengaged during the operation of said cooler or proofer to shorten the pre-set time interval between the loading and unloading of said conveyor tiers.

11. The combination according to claim 6 with the addition of magnetic loading drive clutches through which said loading drive motor drives each of said conveyor tiers, first switches at the loading ends of each of said conveyor tiers activated by said loading boom conveyor, activation of each of said first switches energizing said loading drive motor and energizing one of said magnetic loading drive clutches, magnetic unloading drive clutches through which said unloading drive motor drives each of said conveyor tiers, and second switches at the unloading ends of each of said conveyor tiers activated by said unloading boom conveyor, activation of each of said second switches energizing said unloading drive motor through said switch means activated by said differential and energizing one of said magnetic unloading drive clutches.

12. The combination according to claim 11 wherein said first and second switches each contain a normally closed element, the first switch at the loading end of any given conveyor tier being connected in series through the normally closed element of the second switch at the unloading end of that conveyor tier, and the second switch at the unloading end of any given conveyor tier being connected in series through the normally closed element of the first switch at the loading end of that conveyor tier.

13. A time storage device having a loading conveyor with a pivotally mounted end and a free end, an unloading conveyor with a pivotally mounted end and a free end, spaced conveyor tiers having loading ends adjacent to the free end of the loading conveyor and having unloading ends adjacent to the free end of the unloading conveyor, means successively positioning the free end of said loading conveyor adjacent to the leading ends of said conveyor tiers, means driving and loading each of said conveyor tiers upon the positioning of said loading conveyor adjacent to each of said conveyor tiers, means successively positioning the free end of said unloading conveyor adjacent to the unloading ends of said conveyor tiers a pre-set time interval after the loading of said conveyor tiers, and means driving and unloading each of said conveyor tiers upon the positioning of said unloading conveyor adjacent to each conveyor tier.

References Cited by the Examiner

UNITED STATES PATENTS

| | | | |
|---|---|---|---|
| 746,247 | 12/1903 | Baggaley | 214—16.4 X |
| 2,724,486 | 11/1955 | Hatch et al. | 198—20 |
| 3,038,585 | 6/1962 | Beckley | 198—32 |

EVON C. BLUNK, *Primary Examiner.*

M. L. AJEMAN, *Assistant Examiner.*